May 9, 1944. J. A. MULLER 2,348,403
METHOD OF MAKING PRESS STRUCTURES
Filed Jan. 2, 1941  3 Sheets-Sheet 1
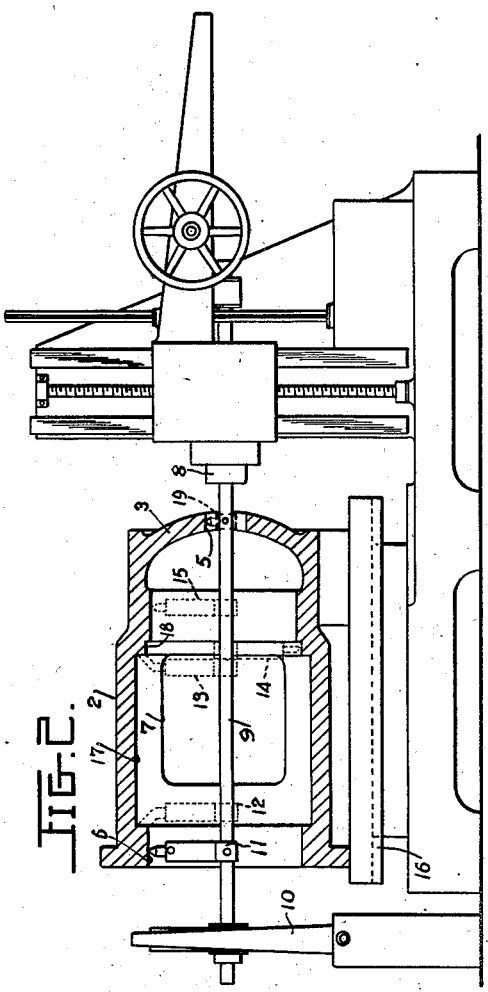
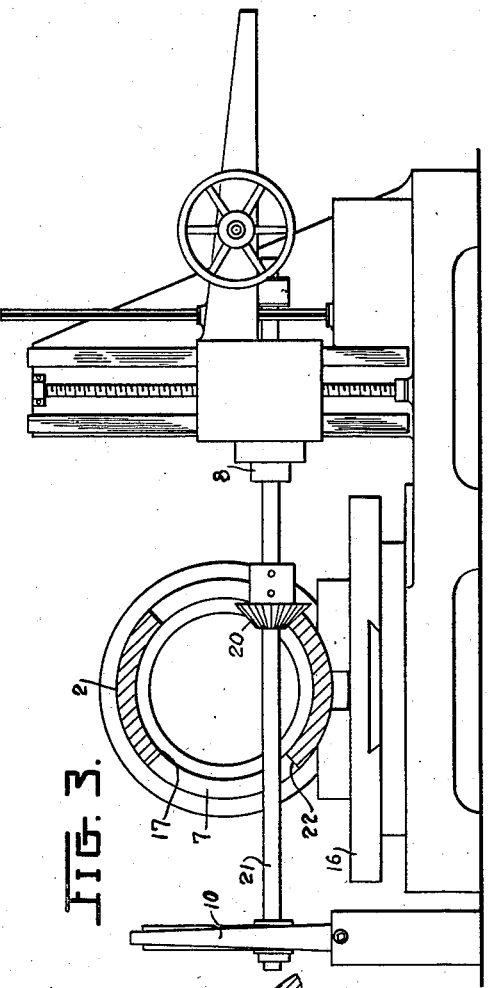
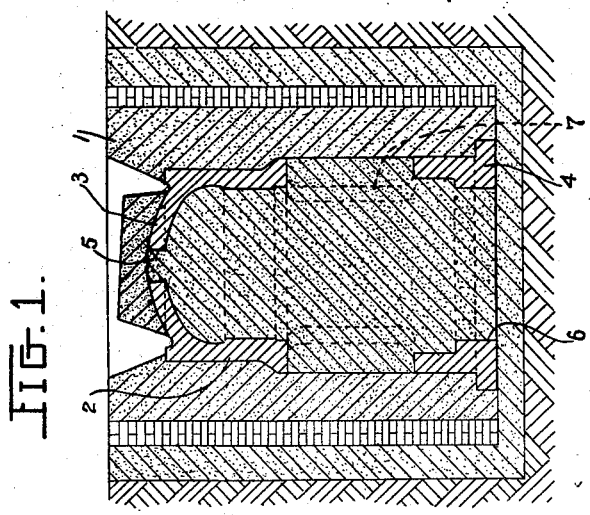
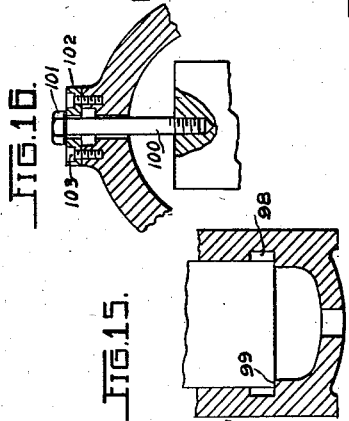
INVENTOR
JOHAN A. MULLER,
BY
ATTORNEYS

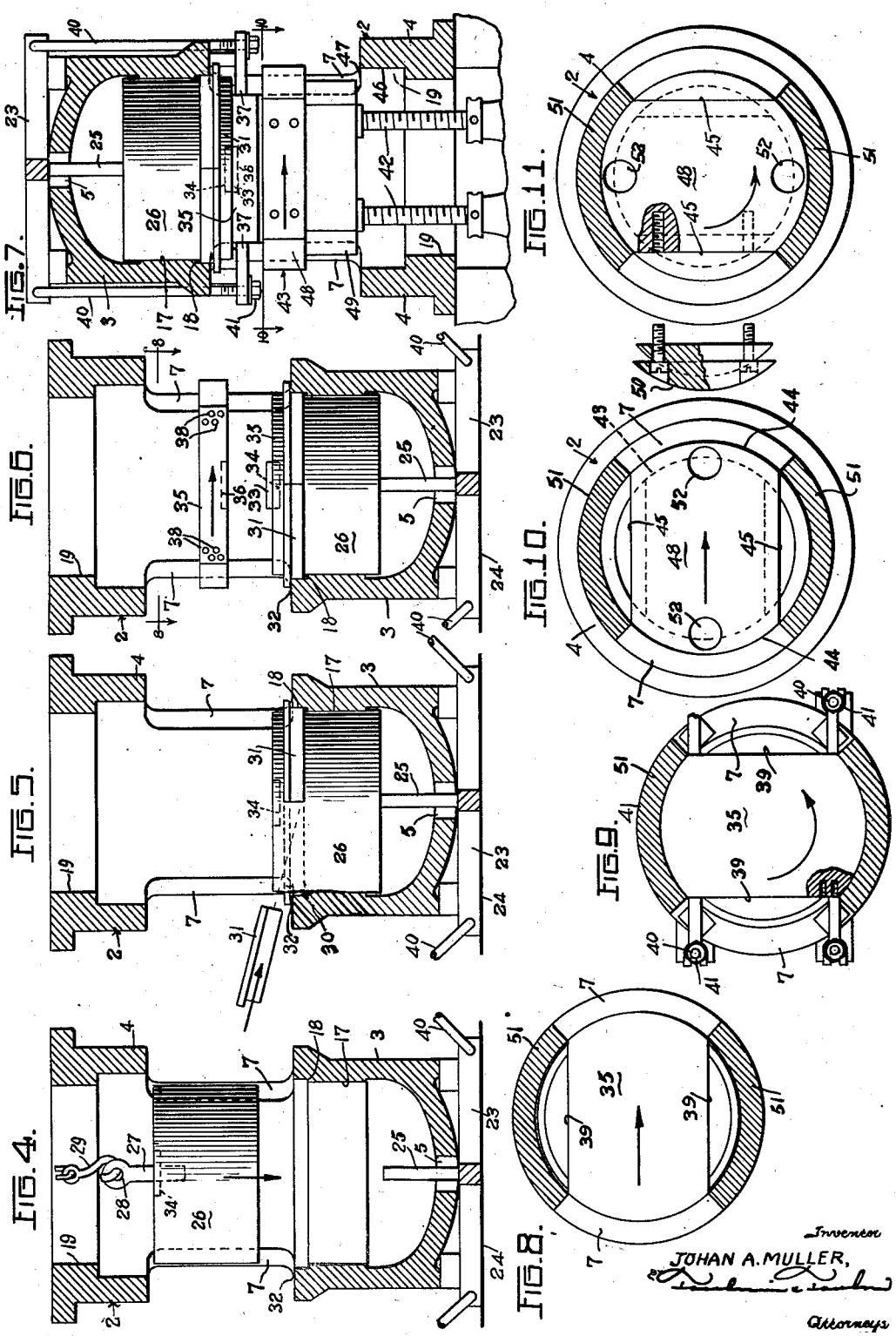

May 9, 1944. J. A. MULLER 2,348,403
METHOD OF MAKING PRESS STRUCTURES
Filed Jan. 2, 1941 3 Sheets-Sheet 3
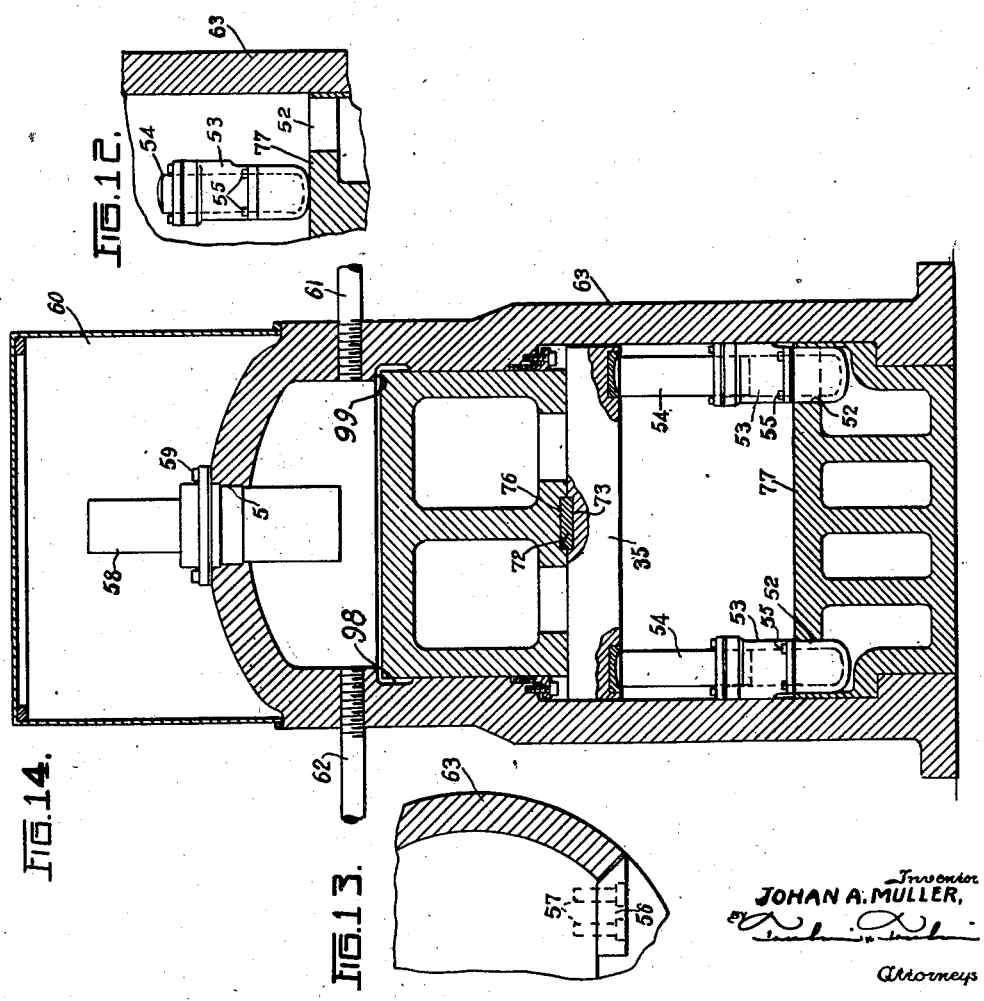
JOHAN A. MULLER,
Attorneys Patented May 9, 1944

2,348,403

UNITED STATES PATENT OFFICE 2,348,403

METHOD OF MAKING PRESS STRUCTURES

Johan A. Muller, Mount Gilead, Ohio, assignor to The Hydraulic Development Corporation, Inc., Wilmington, Del., a corporation of Delaware Application January 2, 1941, Serial No. 372,720

7 Claims. (Cl. 29—148)

This invention relates to presses, and in particular to a new method of making the main body of presses and assembling the means arranged therein.

Heretofore, it was standard practice in the building of presses with a press head and press bed to cast the head and the bed of a press separately and to connect the same by means of strain rods. Such castings include very heavy projecting lugs through which the strain rods pass and which cause such variations in thickness of the sections that it is very difficult to get a sound casting. Furthermore, considerable machining is required for providing the shoulders on the castings for the strain rods and for boring the holes through which the strain rods are passed. In addition to the expensive material required for the said strain rods, the assembling and proper locating of the strain rods and of the bed and head castings takes considerable time, thereby further increasing the cost of production of such presses.

It is, therefore, an object of the invention to provide a simplified method of making and machining the main body of presses.

Another object of the invention consists in the provision of a method of machining the main body of a press which will restrict all machining operations for said main body virtually to turning operations only.

It is another object to provide a method of reducing the machining operation for machining main press bodies to a minimum.

Still another object of the invention consists in the provision of a new and simplified method of assembling the main structure of presses.

These and other objects and advantages of the invention will appear more clearly from the following specification in connection with the accompanying drawings, in which:

Figure 1 shows the casting of the main press body in one piece.

Figure 2 illustrates the machining in one machining setup of all surfaces to be machined in the interior of the main press body.

Figure 3 shows the machining of the guiding surfaces for the platen.

Figures 4 to 13 illustrate various phases of assembling the press structure according to the invention, in which Figure 8 is a section along the line 8—8 of Figure 6, and Figure 10 is a section along the line 10—10 of Figure 7.

Figure 14 is a finished press structure according to the invention.

Figures 15 and 16 show details in connection with a simplified method of assembling according to the invention.

Referring to the drawings in detail, 1 designates the sand mold in which the press body 2 is cast. As will be seen from Figure 1, the press body 2 comprising the press head 3 and press base 4 forms one single casting and is so molded and cast that it is hollow in its interior and comprises a hole 5 in the press head 3, an opening 6 in the press base 4 and windows 7 intermediate the press base and press head. The axis of the hole 5 is preferably in alignment with the longitudinal axis of the press body.

While Figure 1 shows the casting with the press head adjacent the sprue holes, the present invention is, of course, not limited to this particular way of molding and casting. Thus, the molding and casting may as well be effected with the mold reversed so that the casting would stand upside down. In this instance the sprue holes would be adjacent the press bed so that the weight of the iron while being cast will help to expel the air from the press head with the result that the casting will have its greatest density where particularly needed, namely, in the press head comprising the press cylinder.

After the press body is cast it is placed on a horizontal boring machine in a manner shown in Figure 2. As will be seen therefrom, the driving spindle 8 has connected thereto a bore bar 9 passing through the hole 5 and having its end supported by an outboard bearing or steady rest 10. Supported by and rotatably connected with the rotatable bore bar 9 are tool holders 11, 12, 13, 14, 15 and 19, each of which carries a tool for machining the adjacent inner surface of the press body 2. During the machining of the inner surfaces of the press body 2, the latter rests on the machine table 16, while the spindle 8 with the bore bar 9 rotates.

As will be clear from Figure 2, all the inner surfaces to be machined may be machined in one single setup, and it is even possible simultaneously to machine the base bore 6, the shoulder portion 18, the cylinder 17 and the hole 5. After the inner surfaces of the press body 2 have been machined, the bore bar 9 with the tools connected thereto is withdrawn from the press body 2, while the table 16 is rotated by 90 degrees. Thereupon a milling cutter 20 is connected with the spindle 8 and may also be connected with a supporting bar 21 which is passed transversely through the windows of the press body and the free end of which may be supported by the steady rest 10. By rotation of the spindle 8 and gradual advancing of the press body, the guiding surfaces 22 will be machined. This operation finishes the machining operations for the press body 2, which is now placed on its head, as illustrated in Figure 4, after the assembly frame 23 has been placed between the press head 3 and the floor 24 supporting the press body.

The press frame comprises a supporting rod 25, which extends into the interior of the press body through the hole 5 in the press head 3.

The first part to be assembled in the finished press body of Figure 2 is preferably the press ram 26 which, for the purpose of assembling, is advantageously provided with a threaded stud 27 having an eye 28, which may be engaged by the hook 29 of a crane. The press ram 26 is preferably passed through the bore 6 in the press base and lowered into the press body until it abuts and is stopped by the supporting rod 25. Now the stud 27 is removed from the ram 26 and the packing 30 is placed in the shoulder portion 18 between the ram 26 and the cylindrical wall portion of the cylinder 17 in the press head 3. Thereupon gland segments 31 are passed through the windows 7 and connected, for instance by screws, with the press head portion 32 so as to compress the packing 30. Furthermore, a centering disc 33 is introduced into the press body and mounted in a correspondingly shaped recess 34 provided in the bottom of the press ram.

The next member to be assembled is the press platen 35 which is introduced into the press body through one of the windows 7 in the manner shown in Figure 8. When the press platen 35 has been fully inserted into the press body 2, it is rotated by 90 degrees so that it occupies the position shown in Figure 9.

Threaded supporting rods 37 are then threaded into one of the threaded bores 38 provided on the flat sides 39 of the press platen 35. Supporting rods 40 connected to the assembly frame 23 are passed through eyes in the supporting rods 37 and connected thereto by means of nuts 41. The nuts 41 are so tightened that the platen 35 is clamped against the press ram 26 so that the latter is held between the supporting rod 25 and the press platen 35. The press body is then inverted so that it occupies the position shown in Figure 7, whereupon jacks 42 are placed on the floor or in recesses in the floor supporting the press body.

The next step of the assembling operation consists in introducing the main body 43 of the press bed through one of the windows 7 in the manner illustrated in Figure 10.

As will be seen from Figure 10, the main body of the press bed is shaped similar to the press platen and has circular surfaces 44 and flat surfaces 45. After the press bed has been introduced into the press body it is rotated by 90 degrees, as shown in Figure 11, and held in lifted position by the jacks 42. Now auxiliary press bed portions 50 are introduced through the windows 7 of the press body and connected thereto, e. g., by screws. By operation of the jacks 42, the press bed is then lowered into the press base 4 so that the shoulders 46 of the bore 47 abut and support the upper portion 48 of the main body 43 pertaining to the press bed. In this position the lower circular portion 49 of the bed body 43 is located in the bore 6 of the press base.

The main body of the press bed is provided with bores 52 for receiving the push back assembly adapted to return the press ram to its initial position after a drawing operation, The push back assembly comprises push back cylinders 53 and push back plungers 54 which are introduced in collapsed condition through the windows 7 and mounted in the bores 52. After the push back cylinders 53 have been connected with the main body of the press bed, for instance by means of screws 55, the push back cylinders 53 are connected with a fluid source (not shown) and supplied with pressure fluid therefrom so that the push back plungers 54 are lifted until they engage the press platen 35 and lift the same slightly, thereby enabling removal of the assembly frame 23 and the supporting rods 37, 40, pertaining thereto without risking that the ram drops.

Now the gibs 56 for guiding the press platen 35 are passed through the windows 7 and are connected to the platen for instance by screws 57 which may be threaded into the bores 38 previously engaged by the rods 37.

To complete the assembling operation of the press body, a surge valve 58 is passed through the bore 5 and connected in any convenient manner, for instance by screws 59, with the press head.

Furthermore, a fluid reservoir or surge tank 60 is mounted on top of the press head, while intake and exhaust pipes 61 and 62 are connected with the upper portion of the press cylinder 17. The assembling operation for the press body is now fully completed so that the press may be connected with the fluid source in the usual manner for operation of the press.

The assembling operation described in connection with Figures 1 to 13 may be further simplified by casting the press body with an annular recess 98 as indicated in Figures 14 and 15. In this instance, the shoulder 99 as indicated in Fig. 15 in the casting will support the ram when the latter is lowered into the upside down press body illustrated in Figures 4 to 6, thereby making the employment of the supporting member 25 as shown in Fig. 7 superfluous.

Furthermore, the frame assembly 23, 37, 40 may be replaced by a holding bolt 100 which, for holding the ram in its Figure 7 position, may be threaded into the ram, as indicated in Figure 16, and may be suspended by means of its head 101, on a plate 102 detachably connected, e. g., by screws 103 with the dome of the press body.

It will be understood that I desire to comprehend within my invention such modifications as come within the scope of the claims and the invention.

Having thus fully described my invention what I claim as new and desire to secure by Letters Patent, is:

1. A method of making the main body of a press having a press head and a press base, which comprises the steps of simultaneously casting the press head and press base as a single integral hollow unit with windows therebetween, machining the interior of said casting by turning operations only while providing in the base of said casting a shoulder and a bore of a diameter at least slightly greater than the diameter of a press ram to be assembled in the interior of said casting, inserting said press ram through said opening into the press body, closing said opening by a bed member supported by said shoulder, introducing the press platen and guiding means therefor through at least one of said windows, and operatively connecting said platen with said ram.

2. A method of making the main body of a press, which includes the steps of casting a cylindrical hollow body with a press head and press base integral with but spaced from each other by windows in the press body, machining the interior of said casting by turning operations only while providing in the base of said casting a shoulder and a bore of a diameter at least slightly greater than the diameter of the press ram to be assembled in the interior of said casting, placing the press body upside down, lowering said press ram through said base opening, inserting a press platen through one of said windows and operatively connecting the same to said ram, inverting the press head while maintaining said ram and platen in their position relative to said press body, introducing a plurality of bed members through at least one of said windows and lowering the same into the interior of the press for closing said base opening, while supporting said bed members by said shoulder, and inserting through said windows a push back cylinder-piston-assembly and connecting the same with at least one of said bed members and with said platen.

3. A method of making the main body of a press, which includes the steps of casting a cylindrical hollow body with a press head and press base integral with but spaced from each other by windows in the press body, providing a bore in said press base with annular shoulders, machining surfaces including said bore in the interior of said press head and press base in a single machining setup, placing the press body upside down, lowering the press ram through said base opening, providing packing and a gland around said main ram, inserting a platen, having a length greater than its width with its smaller side through at least one of said windows, into said press body, rotating said platen by 90 degrees and lowering the same for engagement with said ram, inverting the press body while maintaining the inserted ram and platen in their position relative to said press body, introducing a plurality of bed members through at least one of said windows into said press body, composing said bed members to a circular bed, supporting said bed by said shoulder, attaching means to said platen for guiding the same in said press body, and connecting said press platen with means for moving said ram away from said bed.

4. A method of making the main body of a press having a press head and a press base, which comprises the steps of casting the press head and press base as a single hollow unit with windows therebetween, machining the interior of said casting by turning operations only while providing in the base of said casting a shoulder and a bore of a diameter at least slightly greater than the diameter of a press ram to be assembled in the interior of said casting, inverting said casting, lowering through said base bore a press ram, inserting through at least one of said windows packing material and parts of a multiple gland, connecting said gland members to make up a circular gland and connecting said gland to said casting, inserting a press platen, having small sides and flat long sides, with its small sides through one of said windows, rotating said platen by 90 degrees and lowering the same for engagement with said ram, inverting the casting while maintaining the members inserted into the casting in their position relative thereto, inserting through one of said windows a main bed member having a contour similar to that of said platen, rotating said main bed member by 90 degrees and lowering the same onto said base shoulder, introducing through at least one of said windows supplementary bed members supplementing said main bed member to a circular body, and interconnecting said main bed member and said platen by a hydraulically operable cylinder-piston-assembly.

5. A method of making the main body of a press, which comprises the steps of casting a hollow cylindrical press body with an integral press head and press base and a plurality of windows therebetween, machining in one setup all inside surfaces to be machined of said casting including the provision of a bore with a shoulder in the base of said casting and a bore in the head thereof, milling two opposite faces of each window, placing said casting upside down, lowering into said casting through said base bore a ram, inserting through at least one of said windows packing material and a multipart gland and arranging the same around said ram, further inserting through at least one of said windows a platen and lifting the same onto said ram while preventing the latter from receding, inverting said casting while maintaining the parts inserted into said casting in their position relative to said casting, lowering onto said shoulder of said base bore through at least one of said windows a multipart bed, passing through at least one of said windows a cylinder-piston-assembly and connecting the same to said bed and said platen for selectively lifting the latter, further passing through said windows guiding means and connecting the same with said platen for guiding the latter, inserting a surge valve into said bore of said press head, mounting a fluid storage tank on said press head, and providing the space confined by said press head and said press ram with a fluid inlet and outlet.

6. A method of making press bodies having a press head and a press base, which comprises the steps of simultaneously casting the press head and press base as a single integral unit with windows therebetween and an opening in the press base, placing the casting with its side wall on the bed of a horizontal boring machine, introducing a boring tool rotatably connected with the spindle of the boring machine into the interior of said press body and machining all inner surfaces to be machined thereof in one single machining setup, withdrawing the boring tool from the interior of said press body, rotating said machine bed by 90 degrees milling the longitudinal edges of said windows, providing a bore in the press base to provide a shoulder therein, placing the pressed body upside down, lowering into the press through said bore in said base a press ram, inserting a platen into the press body, said platen having a greater length than its width through at least one of said windows in a direction wherein the narrow dimension of the platen passes through the window, lowering the platen into engagement with the ram, inverting the press body while maintaining the ram and platen in their position relative to the press body, and introducing a press bed composed of a plurality of members through at least one of said windows into the press body and supporting the same upon said shoulders.

7. A method of making the main body of a press, which includes the steps of casting a cylindrical hollow body with a press head and press base integral with but spaced from each other by windows in the press body and with a stepped opening in said press base and an opening in said press head, passing a boring bar with a plurality of tools intermediate its ends of said boring bar, rotating and feeding said boring bar for machining the inner surfaces to be machined of said press body, withdrawing said boring bar and rotating said press body by 90 degrees about its transverse axis milling two opposite edges of each window providing a bore in said press base having a diameter slightly greater than the diameter of a press ram to be assembled in the press body and providing a shoulder in the press base, placing the press body upside down, lowering into the press body through the base bore a press ram into engagement with the press head, inserting packing material and a packing gland through one of said windows for positioning around said press ram, inserting a platen having a length greater than its width into the press body in a manner that the smaller dimension passes through the window, rotating the platen by 90 degrees and lowering the same into engagement with the ram, inverting the press body while maintaining the inserted ram and platen in their position relative to the press body, introducing a plurality of bed members through at least one of said windows into said press body, composing the bed members into a circular bed, and supporting said bed members by said shoulder.

JOHAN A. MULLER.